US009805554B2

(12) United States Patent
Michel et al.

(10) Patent No.: US 9,805,554 B2
(45) Date of Patent: Oct. 31, 2017

(54) PROVIDING SECONDARY WAGERING-GAME PLAY VIA A MOBILE DEVICE

(71) Applicant: WMS Gaming, Inc., Waukegan, IL (US)

(72) Inventors: Jeffrey E. Michel, Deerfield, IL (US); Andrew C. Guinn, Chicago, IL (US); Damon E. Gura, Chicago, IL (US); Richard B. Robbins, Glenview, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 424 days.

(21) Appl. No.: 14/314,673

(22) Filed: Jun. 25, 2014

(65) Prior Publication Data

US 2014/0378204 A1 Dec. 25, 2014

Related U.S. Application Data

(60) Provisional application No. 61/839,276, filed on Jun. 25, 2013.

(51) Int. Cl.

| | |
|---|---|
| ***G06F 17/00*** | (2006.01) |
| ***G07F 17/32*** | (2006.01) |

(52) U.S. Cl.

CPC ........ *G07F 17/329* (2013.01); *G07F 17/3218* (2013.01); *G07F 17/3223* (2013.01); *G07F 17/3244* (2013.01); *G07F 17/3267* (2013.01)

(58) Field of Classification Search

None

See application file for complete search history.

(56) References Cited

U.S. PATENT DOCUMENTS

| | | | |
|---|---|---|---|
| 8,197,323 | B2 | 6/2012 | Bennett, III et al. |
| 8,231,449 | B2 | 7/2012 | Martineck, Sr. |
| 8,469,260 | B2 | 6/2013 | Lyons et al. |
| 8,701,981 | B2 | 4/2014 | Lyons et al. |

(Continued)

FOREIGN PATENT DOCUMENTS

| | | |
|---|---|---|
| EP | 2549449 | 6/2013 |
| WO | 2009009338 | 1/2009 |

OTHER PUBLICATIONS

"2nd Chance Every Second Counts", calottery.com, Oct. 1, 2012, 2 pages.

(Continued)

*Primary Examiner* — Paul A D'Agostino
(74) *Attorney, Agent, or Firm* — DeLizio Law, PLLC

(57) ABSTRACT

A wagering game system and its operations are described herein. In some embodiments, the operations can include obtaining a game code associated with a secondary game, wherein the game code was scanned from a physical game card. In some embodiments, the game code is scanned by a scanning mechanism of a mobile device. The physical game card is associated with a wagering game. The operations can further include determining an outcome for the secondary game based on the game code. The operations can further include providing, for presentation, an indication of the outcome. In some examples, the indication of the outcome is provided for presentation via the mobile device.

19 Claims, 9 Drawing Sheets

(56) References Cited

U.S. PATENT DOCUMENTS

| | | | | |
|---|---|---|---|---|
| 2009/0197675 | A1* | 8/2009 | Son | G07F 17/32 463/29 |
| 2010/0069136 | A1 | 3/2010 | Safael et al. | |
| 2010/0093421 | A1* | 4/2010 | Nyman | G06Q 20/108 463/17 |
| 2011/0086693 | A1* | 4/2011 | Guziel | G07F 17/32 463/17 |
| 2012/0118947 | A1 | 5/2012 | Lyons et al. | |
| 2012/0202571 | A1 | 8/2012 | Stanek et al. | |
| 2012/0231867 | A1* | 9/2012 | Dimitriadis | G07F 17/32 463/19 |
| 2013/0023339 | A1 | 1/2013 | Davis et al. | |
| 2013/0084932 | A1 | 4/2013 | Nelson et al. | |
| 2013/0130779 | A1* | 5/2013 | Gagner | G07F 17/3267 463/25 |
| 2013/0130785 | A1* | 5/2013 | Small | A63F 13/00 463/25 |
| 2013/0137509 | A1 | 5/2013 | Weber | |
| 2013/0137510 | A1 | 5/2013 | Weber | |
| 2013/0301884 | A1 | 11/2013 | Lyons et al. | |
| 2014/0018155 | A1* | 1/2014 | Nelson | G07F 17/3225 463/25 |
| 2014/0087880 | A1* | 3/2014 | Betts | G07F 17/3267 463/42 |
| 2014/0094272 | A1* | 4/2014 | Kelly | G07F 17/3225 463/25 |
| 2014/0155140 | A1 | 6/2014 | Mikoshiba et al. | |

OTHER PUBLICATIONS

"2nd Chance Games", michiganlottery.com, 2011, 1 pages.
"Oregon State Lottery Second Chance Drawings", Oregon State Lottery, Feb. 1, 2013, 5 pages.
"Second Chance Luck Zone", txlottery.org, 2013, 2 pages.
"Super 2nd Chance Drawing", wilottery.com, 2010, 2 pages.
"Top-Prize Second-Chance Internet Drawing Guidlines Millions Series II", ColoradoLottery.com, 2012, 6 pages.
Northstar Lottery Group, "Merry Millionaire Second-Chance Promotion", IllinoisLottery.com, Nov. 6, 2012, 4 pages.

* cited by examiner

PROVIDING SECONDARY WAGERING-GAME PLAY VIA A MOBILE DEVICE

RELATED APPLICATIONS

This application claims the priority benefit of U.S. Provisional Application No. 61/839,276 filed Jun. 25, 2013, which is incorporated herein by reference in its entirety.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

TECHNICAL FIELD

Embodiments of the inventive subject matter relate generally to wagering game systems and networks that, more particularly, provide secondary wagering game play via a mobile device.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, road-side casinos, etc.). The casinos are located in specific geographic locations that are authorized to present wagering games to casino patrons. Furthermore, some wagering game providers offer physical game cards. For example, many states offer lotteries that use physical game cards such as lottery tickets and scratch cards. A player can purchase the physical game card at a specific physical location associated with a vendor that is authorized to sell the physical game card. For example, the player can purchase the physical game card at a store counter or via a vending machine.

As mentioned previously, one type of physical game card is a scratch card. A scratch card is typically used in a type of "instant-win" type of wagering game where the outcome for the wagering game is revealed instantly on the card. For example, a scratch card may indicate, somewhere on the card, a top award value that can be won for the wagering game (e.g., the scratch card has a title that indicates a player can win "$200,000"). A player scratches off one or more portions of the card that have scratchable material. When the scratchable material is removed (e.g., scratched away), an outcome to the wagering game is revealed underneath. The outcome indicates whether the player has won the top award, some other prize associated with the wagering game, or no award. If the player wins a prize, to redeem the prize the player can show the physical card to an employee of the vendor at the physical location where the card was purchased. In another example, the player can provide the physical game card to the provider of the wagering game (e.g., take the physical card to a state lottery office).

With the proliferation of interest and use of the Internet, shrewd wagering game manufacturers and wagering game providers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet. As a result, wagering game manufacturers, casino operators, and game providers, including those who provide physical game cards (e.g., for lottery type games), are constantly in need of innovative concepts for online wagering games and related online services or products.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into four sections. The first section provides an introduction to embodiments. The second section describes example operations performed by some embodiments while the third section describes example operating environments. The fourth section presents some general comments.

Introduction

This section provides an introduction to some embodiments.

Some embodiments of the inventive subject matter include detecting a second-chance game code associated with a physical game card. The physical game card is associated with a wagering game (e.g., a scratch card for a lottery game). The second-chance game code is associated with a secondary game different from the primary wagering game whose play is fully contained within the information on the card or ticket. The second-chance game code can be used to perform a round of play ("game-play round") for the secondary game. In some examples, the second-chance game code is detected via an input mechanism of a hand-held, personal mobile device (e.g., a cellphone, a smartphone, a personal digital assistant, a tablet computer, etc.).

The input mechanism, for instance, can scan, read, capture, record, etc., the second-chance game code (e.g., a camera on the mobile device takes a picture of a physical symbol or text string printed on the physical game card, a scanner on the mobile device scans a barcode or QR code printed on the physical game card, etc.). The mobile device can convert the game-code from a non-computer readable format into a computer-readable format (e.g., the mobile device converts an image of a text string into a data string with corresponding alpha-numeric characters). The mobile device can provide the second-chance game code, in the computer-readable format, to a second-chance game controller (e.g., provide the second-chance game code to a gaming application of the mobile device and/or transmit the second-chance game code to a server associated with a provider of the secondary game). The second-chance game controller can receive the second-chance game code and perform the game-play round in the secondary game using the second-chance game code (e.g., the gaming application or server decodes the second-chance game code to verify that the game-play round is authorized and/or uses information from the decoded second-chance game code to initiate the game-play round). The second-chance game controller generates an outcome or displays a pre-determined outcome for the game-play round (e.g., generates or displays a winning or losing outcome for the secondary game) and provides the outcome for presentation via an output mechanism of the mobile device (e.g., for presentation via a display of the mobile device). In some examples, the outcome is associated with a user account of a user who paid for the wagering game, who played the wagering game, who is associated with mobile device, and/or who redeems a prize associated with the outcome.

Figure 1:
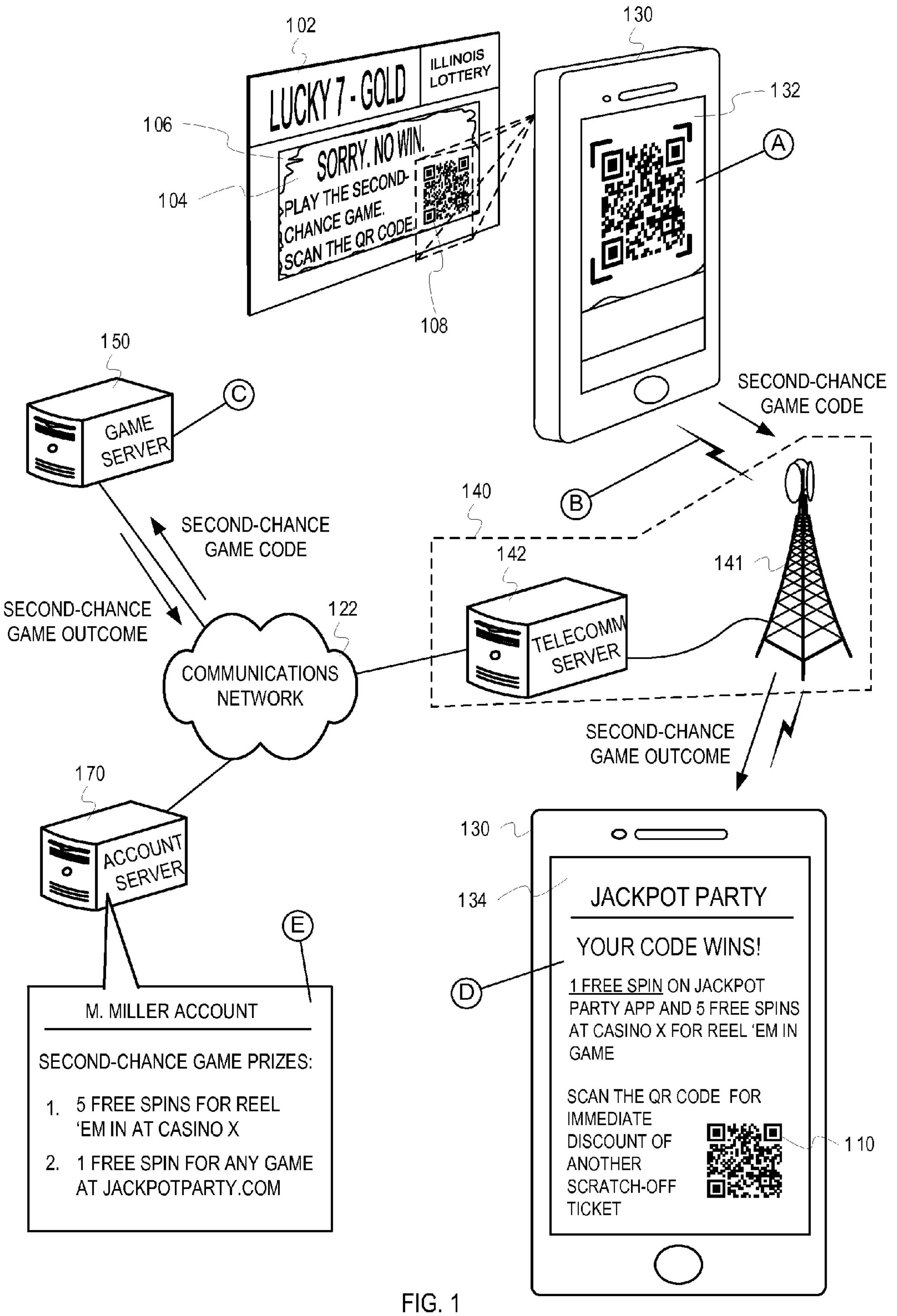
FIG. 1 is an illustration of scanning, via a mobile device, a second-chance game code on a physical game card for a wagering game, according to some embodiments.

FIG. 1 is a conceptual diagram that illustrates an example of scanning, via a mobile device, a second-chance game code on a physical game card for a wagering game, according to some embodiments. In FIG. 1, a mobile device 130 is configured to obtain information from a physical game card, such as a scratch card 102 for a lottery game. The scratch card 102 includes a playing area 104 covered with a scratchable material 106. When the scratchable material 106 is removed (i.e., scratched away), the scratch card 102 reveals an outcome for the lottery game.

In the example of FIG. 1, the scratch card 102 shows a non-winning outcome for the lottery game. However, the scratch card 102 also includes, in the playing area 104, a second-chance game code 108 configured for use in a secondary game. In FIG. 1, the second-chance game code 108 is a QR code, but other types of identifiers may be used, such as a bar code or an alphanumeric code, a symbol, a text string, etc. The second-chance game code 108 may be referred to herein as a "second-chance" game code because it provides a second opportunity to play in a second game different from the lottery game.

At a first stage "A," the mobile device 130 scans the second-chance game code 108, such as by taking a picture of the second-chance game code 108 with a camera of the mobile device 130. A reader application 132 reads the second-chance game code 108 and either decodes the second-chance game code 108 or provides the second-chance game code 108 to a device that decodes the second-chance game code 108. For example, the mobile device 130 is connected to a telecommunications network 140 that includes a telecommunication tower 141 and a telecommunication server 142.

At a second stage, "B," the mobile device 130 communicates with the telecommunication server 142 via cellular transmissions with the telecommunication tower 141. The telecommunication server 142 is connected to a communications network 122, such as the Internet. If the game code 108 has not already been decoded (e.g., by the mobile device 130), the telecommunication server 142 can be configured to decipher the QR code. In some embodiments, the telecommunication server 142 can transmit the QR code to an additional server that can decipher the QR code, such as, but not limited to, a game server 150.

At a third stage, "C," the game server 150 determines, based on the second-chance game code 108, an outcome for a game-play round for the secondary game. For example, the game server 150 decodes the second-chance game code 108 to determine that it is a valid code that can be used for game play in the second game. The game server 150 plays the game-play round and determines an outcome for the game-play round (e.g., the game server 150 uses a random number generator to generate the outcome or the game server 150 looks up a pre-determined outcome associated with the second-chance game code 108). The game server 150 then provides to the mobile device 130 an indication of the outcome. The game server 150 communicates with the mobile device 130 via the communications network 122 and via the telecommunications network 140.

At a fourth stage, "D," the mobile device 130 receives the indication of the outcome and provides, via an additional application 134, the indication of the outcome. The additional application 134 may be different from the application 132. The application 134 can further indicate information about one or more prizes associated with the outcome. The prizes can be redeemed via the application 134 and/or via another server or device. For instance, the prize can be redeemed via the Internet using a browser application of the mobile device 130. In another example, the application 134 can present a prize code 110 that can be used to redeem the prize (e.g., an additional QR code that can be physically scanned by a third-party reader). In one example, the prize code 110 may be used to obtain discounts for additional lottery tickets. In other examples, the prize code 110 may be used at other establishments, such as retail stores. In some examples, prizes can be offered that offer store credits that can be redeemed at the same location that the scratch card 102 was purchased.

At a fifth stage, "E," an account server 170 stores in a user account information about the outcome, such as to increment a counter for secondary-game play or to store information about one or more prizes associated with the outcome. The user account is associated with the player that is associated with the mobile device 130. A device connected to the communications network 122 (e.g., the game server 150, a casino server, a prize sponsor server, etc.) can read the information in the user account and use the information to redeem the prize or provide additional prizes or information (e.g., goods, services, content, games, help, etc.). In some examples, prizes can be offered that offer store credits or that deposit credits into an account (e.g., the game server 150 adds credits to an iTunes® account by Apple Inc., the game server 150 deposit credits or cash directly into a credit card or bank account, etc.).

It should be noted that although some embodiments described herein, such as those described in FIG. 1, describe scanning a game code using a mobile device, other embodiments may include scanning a game code using a device that is non-mobile. For example, a fixed scanner (e.g., in a gaming kiosk, connected to a vending device, etc.) can be connected to a computing device that has access to the Internet. The fixed scanner has scanning capabilities to scan the game code. The computing device can convey the scanned game code to a secondary game controller. The secondary game controller can provide an indication of an outcome to the computing device, or to another device, such as a mobile device. In some embodiments, the computing device can be the mobile device, which can be connected to, or communicatively coupled with, the fixed scanner.

Further, some embodiments of the inventive subject matter describe examples of providing secondary wagering game play via a device in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, for purposes of the present detailed description, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Furthermore, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Although FIG. 1 describes some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 2:
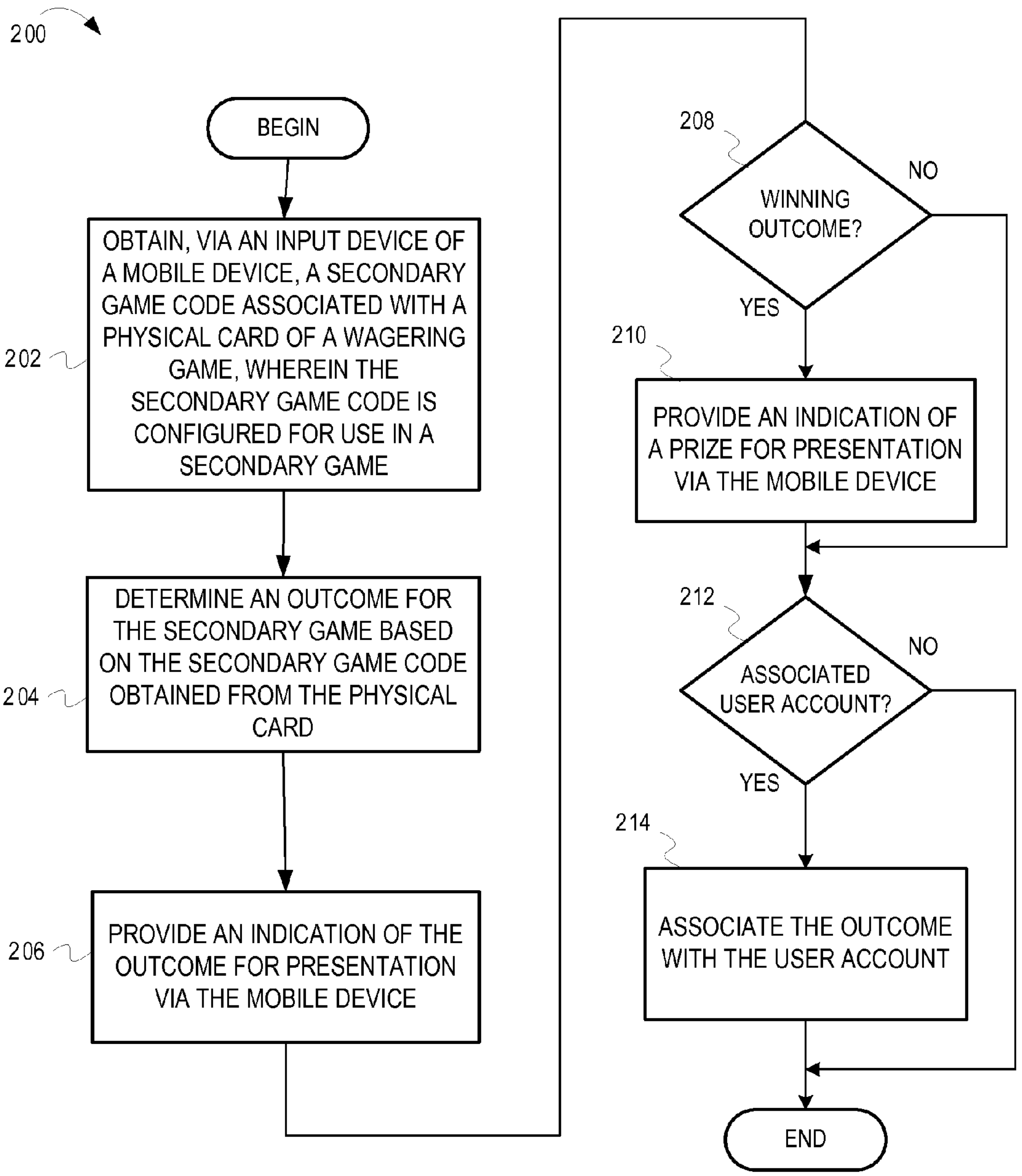
FIG. 2 is a flow diagram 200 illustrating determining an outcome for a secondary game based on a game code obtained via a mobile device from a physical game card associated with a wagering game, according to some embodiments.

FIG. 2 is a flow diagram ("flow") 200 illustrating determining an outcome for a secondary game based on a game code obtained via a mobile device from a physical game card associated with a wagering game, according to some embodiments. FIGS. 3, 4, 5, and 6 are conceptual diagrams that help illustrate the flow of FIG. 2, according to some embodiments. This description will present FIG. 2 in concert with FIGS. 3, 4, 5 and 6. In FIG. 2, the flow 200 begins at processing block 202, where a wagering game system ("system") obtains, via an input device of a mobile device, a secondary game code associated with a physical card of a wagering game, wherein the secondary game code is configured for use in a secondary game. In some embodiments, the mobile device is a hand-held, personal mobile device, such as a smartphone. In some embodiments, the mobile device includes various input devices configured to scan, sense, record, read, detect, or otherwise obtain information from the physical game card.

In some embodiments, the secondary game code is a unique identifier that is encoded in a computer-readable format (e.g., a barcode, a QR code, a signal, etc.). The input device can read the computer-readable format in various ways (e.g., electronically, magnetically, optically, etc.). For example, a camera on the mobile device can take a picture of the secondary game code. In another example, the mobile device can scan a magnetic strip on the physical game card (e.g., via a magnetic reader attachment on the mobile device). In another example, the mobile device can optically scan a barcode using an optical reader. In yet another example, the mobile device can detect a signal from the physical game card via RFID and/or near-field communication.

In some embodiments, the secondary game code is in a format that is not computer-readable, but that can be detected and converted into a computer-readable format. For example, the secondary game code may be a string of characters printed on the physical card. The mobile device can take a picture of printed string of characters and convert the image of the string of characters to a digitized format via an optical character recognition (OCR) process. In some embodiments, the mobile device can take a picture of a barcode or QR code and convert the image of the barcode or QR code to an electronic version of the barcode or QR code.

In some embodiments, the physical game card is associated with a variety of types of wagering games, such as a lottery, a bingo game, a wagering game from a wagering game machine, etc. In some embodiments, the outcome for the wagering game (the "wagering game outcome") is presented on the physical game card. The wagering game outcome may reveal a winning monetary result for the wagering game (e.g., an amount equal to, or less than, a top monetary award value for the scratch card) and the secondary game code is also printed on the physical game card. For example, the physical game card may be a scratch card (see FIG. 1), which can indicate the wagering game outcome and also the secondary game code when scratchable material is removed. In another example, the physical game card is a ticket or print out from a wagering game machine or a ticket dispenser that is separate from an indication of the wagering game outcome. For example, when a player purchases a scratch card or plays a wagering game on a machine, a ticket dispenser prints a ticket, with the secondary game code for the player to scan using the mobile device. In other embodiments, a machine can transfer the secondary game code to the mobile device, such as via radio frequency transmission, near-field communication, text, email, etc. In some embodiments, the machine presents the secondary game code via a display, which the mobile device can scan using an input device of the mobile device.

In some embodiments, the secondary game code is only revealed when an outcome for the wagering game is a losing outcome. For example, in FIG. 1, the second-chance game code 108 is included in the game play area 104 underneath the scratchable material 106. The manufacturer of the physical game card 102 is aware that the outcome for the scratch card will be a losing outcome for the lottery game and, therefore, the manufacturer creates the physical game card 102 to show the losing outcome for the lottery game and to show the second-chance game code 108. In some embodiments, however, a provider of the wagering game does not know ahead of time whether the outcome for the primary game will be a losing outcome. For example, when a wagering game is played on a wagering game machine, the outcome is generated only at the time that the player makes a wager on the wagering game. If the outcome for the particular wager is a losing outcome, the wagering game machine can print out a ticket that includes the secondary game code, or present the secondary game code on a display of the wagering game machine.

The flow 200 continues at processing block 204, where the system determines an outcome for the secondary game based on the secondary game code obtained from the physical card. In one example, a secondary game controller on the mobile device verifies the secondary game code and determines an outcome for the wagering game (e.g., via a gaming application of the mobile device). In another example, the mobile device opens an application (e.g., a gaming application, a web browser, a texting application, etc.) on the mobile device and automatically provides the secondary game code to another device (e.g., the secondary game controller) via a communication protocol utilized by the application (e.g., sends the secondary game code via telecommunication data, via HTTP, text messaging, etc.). For instance, the application submits the secondary game code to a server that decodes the secondary game code and determines an outcome for a round of play in the secondary game. In another example, the mobile device uses the secondary game code to generate a link to send to a secondary game controller on another device. For example, an application on the mobile device can detect a value for the secondary game code (e.g., reads and/or decodes a portion of a QR code using a QR reader.) The mobile device generates a link based on the QR code. The link opens in a browser application on the mobile device and initiates a transmission of the link to a server (e.g., via HTTP). A server receives the link and reads, from the link, data that can be used to verify that the secondary game code is valid and/or to initiate play of the secondary game. The link may comprise a URL with a domain name (i.e., to identify and/or direct the link to a game server) and a unique identifier (to identify the secondary game code). In some embodiments, the play of the secondary game results in an outcome for the secondary game. For example, the secondary game controller can include a random-number generator to generate a random number. The random number can be used to generate a presentation of the game-play round and/or to indicate an outcome for the game-play round. The secondary game controller then provides, for presentation via the mobile device, an indication of the outcome (e.g., whether the secondary game code has won a prize in the secondary game). In another embodiment, instead of generating an outcome for the secondary game when the secondary game code is received, the secondary game controller can instead look up an outcome that was previously associated with the secondary game code. For example, when generating a physical game card, a wagering game provider may generate an outcome for the secondary game code and associate the outcome with the unique secondary game code (e.g., store both the outcome and the secondary game code in a database). The wagering game provider then prints the secondary game code on the physical game card. Later, for example when the mobile device scans the secondary game code and submits the game code to the secondary game controller, the secondary game controller can look up the outcome that is associated with the secondary game code. For example, the secondary game controller can look up a record in the database that is associated with the secondary game code, which record indicates, or is associated with another record that indicates, the outcome for the secondary game that was previously determined and stored in the database.

In some examples, the mobile device submits a secondary game code via an application of the mobile device and receives an indication of an outcome for the secondary game via the same application. For example, the mobile device submits a first text message to the secondary game controller via a text messaging application. The mobile device then receives a return text message via the same text messaging application. The text message can include an indication of the outcome. In another example, the mobile device submits a code via a gaming application and receives an indication of the outcome via the same gaming application.

In some examples, the mobile device submits a secondary game code via a first application of the mobile device and receives an indication of an outcome for the secondary game via a second application. For example, the mobile device submits a first text message to the secondary game controller via a text messaging application. The mobile device then receives a return text message. The return text message includes a link embedded in it. When the link is activated, via the text message, the mobile device opens a browser application and the browser application uses the link to access a website, which reveals an outcome.

The flow 200 continues at processing block 206, where the system provides an indication of the outcome for presentation via the mobile device. In some embodiments, the outcome is provided for presentation via an output mechanism associated with the mobile device. For instance, the outcome is provided as a message, as content, etc., that has a format which an application of the mobile device can read and present via a display device of the mobile device, via speakers of the mobile device, and/or via peripheral devices communicatively connected to the mobile device. In some embodiments, the mobile device may require that the player take a picture of the entire physical game card. The application recognizes certain identifiers of the card (e.g., uniquely identifiable elements and/or identifiable structure of the physical game card such as corners of the card). Then, using augmented reality, the application presents a secondary reveal (e.g., overlays or superimposes graphics onto the picture of the card and plays the game-play round for the secondary game, with anticipatory graphics and sounds).

The flow 200 continues at processing block 208, where the system determines whether the outcome is a winning outcome. If the outcome in the secondary game is not a winning outcome, then the process continues at block 212. However, if the outcome is a winning outcome, then the process continues at block 210 where the system provides an indication of a prize for presentation via the mobile device. In some embodiments, a prize is associated with the game-play round of the secondary game. For example, if the game-play round of the secondary game results in a winning outcome, the secondary game controller selects a prize associated with the outcome. The prizes may vary depending on game rules for the secondary game. In some examples, the prize includes, but is not limited to, goods, services, merchandise, entries into a sweepstakes drawing, virtual currency, free spins for wagering games, credits, virtual items, discounts, etc. In some examples, the secondary game controller selects the prize randomly from a plurality of prizes. In other examples, the secondary game controller reads preferences associated with an account for the user (e.g., for an account used to login to a gaming application of the mobile device). Based on the preferences, the system determines what prize to select. In some embodiments, the secondary game controller determines past performance data for the user and generates a prize accordingly. For example, based on the past performance, the secondary game controller can determine a prize that encourages the player to perform an activity that could potentially result in the most lucrative result for a game provider. For instance, the secondary game controller detects, based on past game play, that the player prefers a specific wagering game (e.g., determines that the player has historically spent the most on, or played most often, the REEL 'EM IN® wagering game by WMS Gaming Inc.). The secondary game controller, therefore, can select, as the prize, free spins for that wagering game based on the assumption that the player is most likely to spend money on additional spins for the game after using the free spins. In another example, based on past performance, the secondary game controller can select a prize that pushes the player to a casino where the player has the highest standing or status in a customer loyalty program. For example, the secondary game controller accesses one or more player accounts for the player associated with different casinos and determines that, for all of the player accounts, the player has the highest status in a customer loyalty program at Casino X. The secondary game controller, therefore, can select Casino X as being the prize provider or associated with providing the prize (e.g., the secondary game controller provides 5 free spins for games at Casino X).

In some embodiments, the prize is funded by marketing dollars. In some embodiments, the prize is funded from an initial purchase of a physical game card. The wagering game associated with the initial purchase of the physical game card may return a lower amount to compensate for the funding of the prize in the secondary game. For example, in some examples, if the prize is discounts on additional lottery tickets, the discount can be funded by the profit margin on the sale of the additional tickets.

In some examples, the prize is sponsored, or co-sponsored by multiple providers of products and services.

In some embodiments, the secondary game controller provides an indication of the prize with the outcome to be presented via the mobile device. In some embodiments, the indication of the prize is the indication of the outcome.

In some embodiments, the secondary game controller generates a prize code and provides the prize code to the mobile device. In some examples, the prize code is configured to be scannable by a third-party device associated with a supplier of the prize. If the prize is for a third-party provider of a product or service, the secondary game controller provides a prize code that can be scanned by a scanning device at the third-party provider's business establishment. For example, the secondary game controller provides a QR code, or barcode, to be printed out and/or scanned by a barcode scanner. For example, if the prize is a discount on additional lottery tickets, the secondary game controller provides a scannable code that can be scanned by a ticket dispensing device or by a merchant scanning device. In some embodiments, the prize code is configured to be entered into a user interface associated with the provider of the product or service. For example, the prize code may be an alphanumeric text string that can be entered on a webpage and/or included in a web link to a website associated with the prize provider.

In one example, the prize code is provided to an application on the mobile device (e.g., provided to a wagering game application on the mobile device and/or to a browser application of the mobile device to initiate a free-spin of a wagering game).

In one embodiment, the outcome only indicates that the secondary game code on the card is a winning code, and the user then has to take the card (with the secondary game code) to a location that will scan the secondary game code from the physical game card and use it to provide the product or service associated with the secondary game code.

Figure 3:
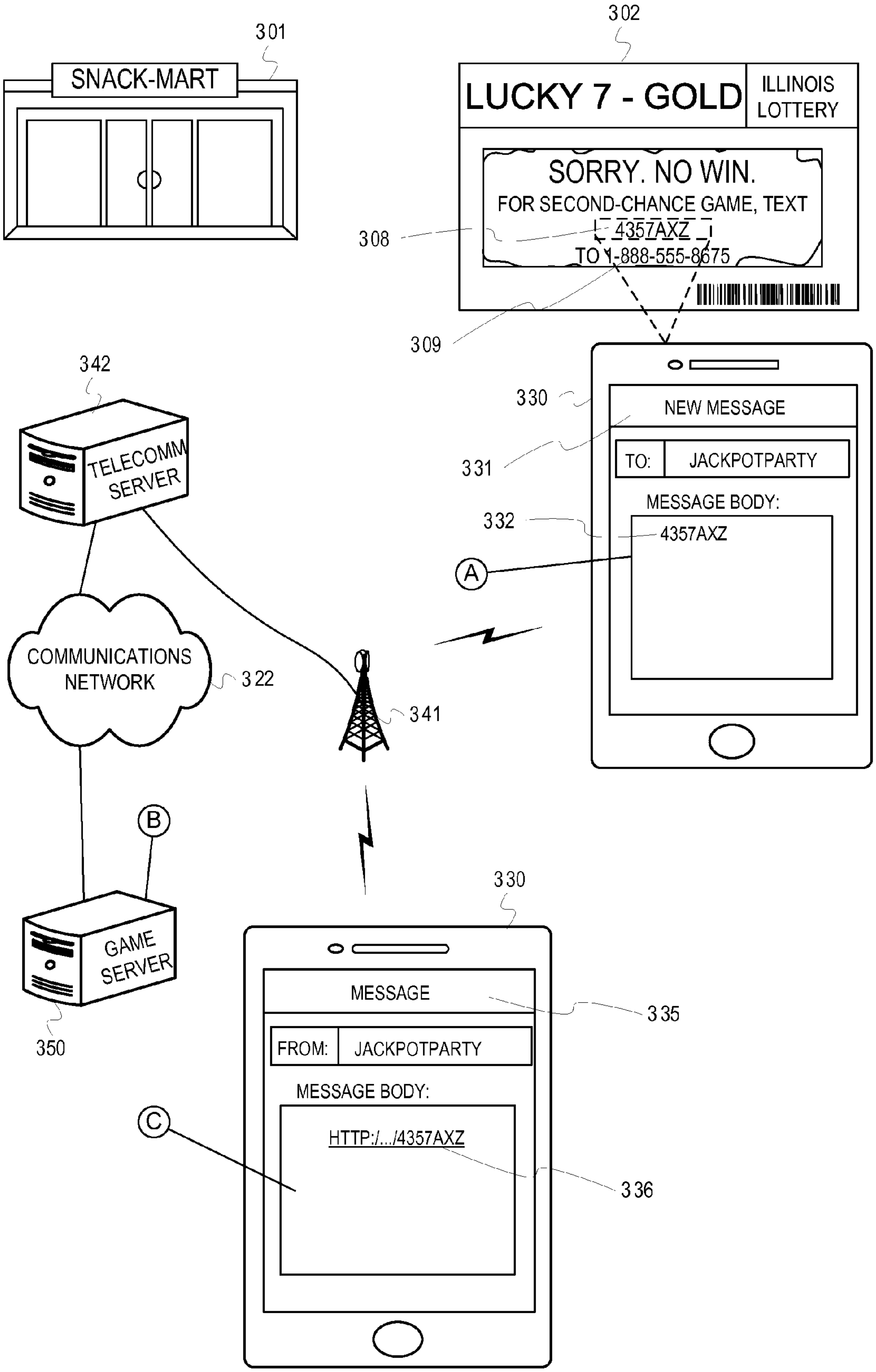
FIGS. 3 and 4 are illustrations of providing secondary game play and prizes of a secondary game based on a location of a mobile device, according to some embodiments.
Figure 4:
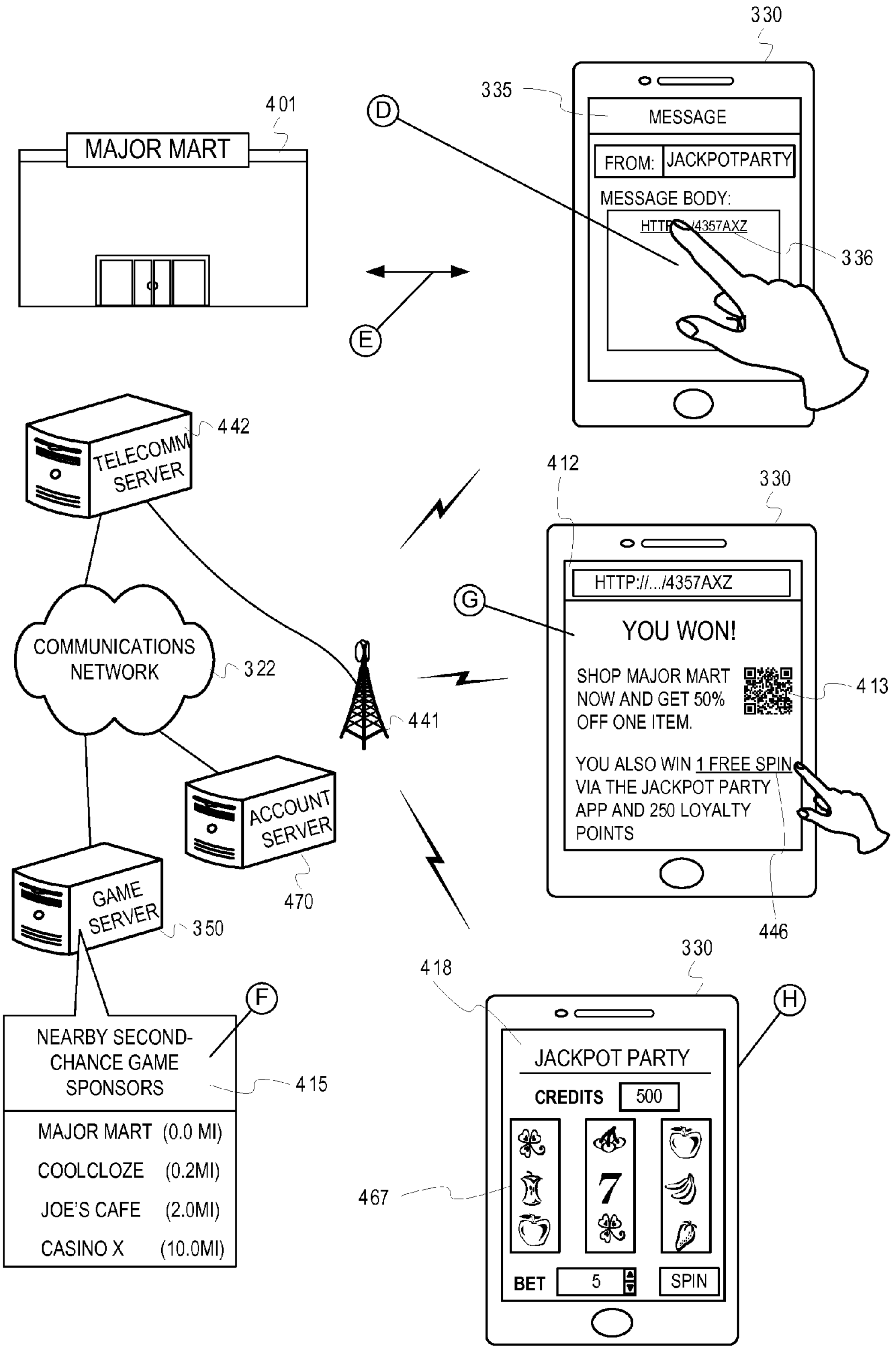
Figure 5:
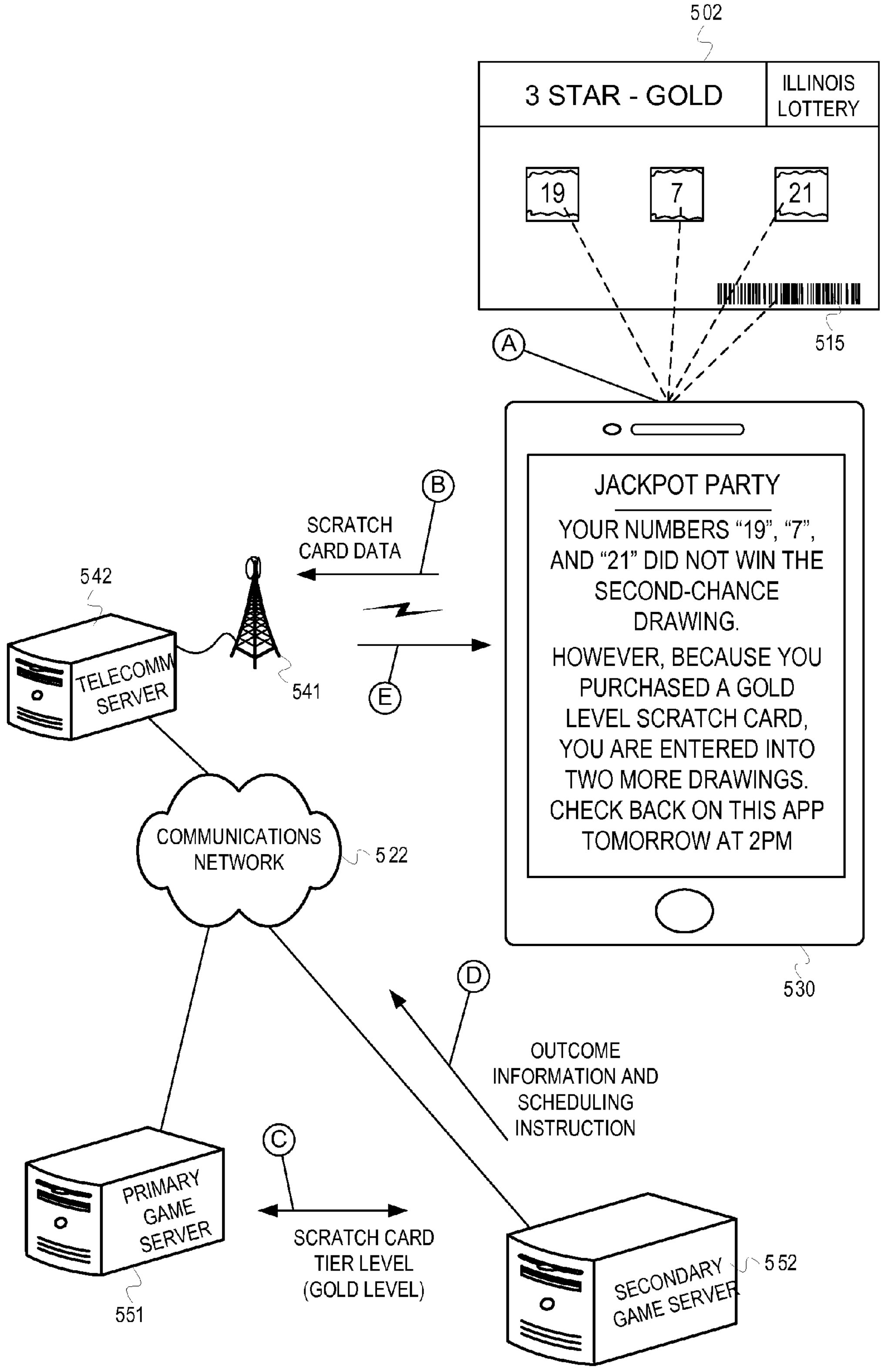
FIG. 5 is an illustration of controlling a secondary game based on a game level detected for a wagering game via a mobile device, according to some embodiments.

In some embodiments, the value of the prize and/or the redemption of the prize can be tied to a location of the mobile device. For example, there may be a requirement for the mobile device to travel to and be located at a given prize sponsor's place of business or at a location with a prize sponsor's affiliates/partners. In some embodiments, there can be a requirement that the mobile device visit a sequence of locations. In some embodiments, at the time of the determination of the secondary prize, the mobile device may need to be located at, or near, a given geographic location when the secondary game is played (e.g., the prize can be for good or service at a location that is near the mobile device when the secondary game code is scanned by the player). In another example, the prize changes based on the movement of the mobile device when the prize is redeemed. FIGS. 3 and 4 illustrate an example of detecting a location of a mobile device and providing a reward for a secondary game based on the location. For example, in FIG. 3, a physical game card ("game card") 302 is purchased at a first location 301 (i.e., at the fictional convenience store "Snack-Mart"). The game card 302 is a scratch card that has been scratched to reveal a non-winning outcome. The game card 302, however, includes a secondary game code 308.

At a first stage, "A," a mobile device 330 scans the secondary code 308 and generates a first text message addressed to a telephone number 309 indicated on the game card 302. The mobile device 330 recognizes that the telephone number 309 is associated with a contact on the phone called "JackpotParty", which is associated with the JackpotParty.com website. The mobile device 330 digitizes the secondary code (e.g., via OCR) and generates a text string 332 to include in the message body of the first text message 331. Furthermore, the mobile device 330 sends the text message to a game server 350 (e.g., via a telecommunication transmission via a telecommunication tower 341 and a telecommunication server 342 connected to the game server 350 via a communications network 322).

At a second stage, "B," the game server 350 generates a return message with a link 336. In some embodiments, the return message is a second text message (e.g., text message 335) that includes the link 336. In other embodiments, however, the return message (with the link 336) may be received by and/or accessible from one or more different applications, such as a web application, a social networking application, a gaming application, etc. The link 336 can be activated via the same application in which the return message is being viewed or via another application. For example, if the link 336 is activated when the return message is viewed via a gaming application, then the gaming application may use the link 336 to access, and present, secondary-game play. In other embodiments, however, the link 336 may be accesses in one application (e.g., in a text message application), which then triggers a second application (e.g., a browser application) to access the link 336 via the Internet. The second application can then present secondary-game play based on the link 336.

At a third stage, "C," the mobile device 330 receives the text message 335 with the link 336.

In FIG. 4, at a fourth stage, "D" the mobile device 330 has moved away from the location 301 to a second location 401 (e.g., at the fictional retail store "Major Mart"). At stage D, a user activates the link 336 on the text message 335. The mobile device 330 launches a browser application 412 and uses the link 336 to access the game server 350 (e.g., via a different telecommunication tower 441 and/or a different telecommunication server 442 connected to the game server 350 via the communications network 322).

At a fifth stage, "E," the game server 350 determines that the link 336 is valid and generates an outcome for a secondary game. The outcome is a winning outcome, so the game server 350 initiates a process to determine a prize to award. The game server 350, therefore, queries the mobile device 330 to detect the location of the mobile device 330. The game server 350 determines that the mobile device 330 is within a proximity to the location 401.

At a sixth stage, "F," the game server 350 looks up a listing of prize sponsors ("list") 415. The game server 350 detects several prize sponsors who have a physical establishment within a given proximity threshold (e.g., within 10 miles) from the location of the mobile device 330. The list 415 indicates that Major Mart is the closest establishment to the mobile device 330. Therefore, at stage "F," the game server 350 generates an indication of the winning outcome, along with an indication of a prize that can be used at Major Mart.

At a seventh stage, "G," the mobile device 330 receives the indication of the outcome and prizes and presents them in the browser application 412. For example, the browser application 412 indicates a 50% discount off a single item at Major Mart. Further, the browser application 412 presents a prize code 413 that can be scanned at a check-out register in the Major Mart establishment. Further, the browser application 412 indicates that a free spin is available via a gaming application 418 of the mobile device 330 and that a given number of customer loyalty points are awarded for a player account. The player account is associated with an account server 470 connected to the communications network 322. The game server 350 stores in the player account an indication of the prize code 413, the free spin, and the loyalty points. Further, when an additional link 446 is activated, the gaming application 418 initiates a play of a wagering game (e.g., spins reels 467 of an electronic slot wagering game).

In some embodiments, a secondary prize value or a number of secondary opportunities can be based on a level or tier of play associated with the wagering game. For example, the lottery ticket provider has a subscription service, or different types of lottery cards, with at least two levels (e.g., Silver, Gold). The Silver level provides only one secondary opportunity. The Gold level provides multiple secondary opportunities. In some embodiments, a player can be a subscriber (e.g. pay a monthly fee) to be at a certain level. In some embodiments, at the time of purchase of the physical card and/or at the time of wagering activity of the wagering game, the player can pay extra to obtain a higher level (e.g., at the time of purchase of a scratch card, the player can buy the Gold version of the lottery game instead of the Silver version, or vice versa—the purchase price of the Gold version costing more than that of the Silver version). To redeem multiple secondary codes, the mobile device submits multiple secondary game codes simultaneously. In another example, the player does not win the secondary game, but in time (e.g., the next day) the player can log in to a website and see an additional reveal in the secondary game. For example, in FIG. 5, a physical game card 502 shows multiple reveals (e.g., multiple places to scratch). For instance, the physical game card 502 is a lottery game where a player must scratch away the multiple places to get three star symbols in order to win a top prize. After scratching away the multiple places, a set or sequence of three numbers are revealed. The three numbers, collectively, are used as a secondary game code.

At a first stage, "A," a mobile device 530 scans the three numbers as well as a barcode 515. The barcode 515 indicates that the physical game card 502 has a specific game tier (i.e., the "Gold" level version of the "3 Star" lottery game).

At a second stage, "B," the mobile device 530 sends the data from the scratch card ("scratch card data") which includes the three numbers (i.e., the "19," "7," and "21" on the physical game card 502) as well as information associated with the barcode 515 (i.e., the information that indicates the "Gold" level for the physical game card 502) to a secondary game server 552 (i.e., via communication with the telecommunication tower 541 and the telecommunication server 542 via the communications network 522).

At a third stage, "C," the secondary game server 552 receives the scratch card data and queries a primary game server 551 regarding the barcode 515 and regarding specifics regarding the "Gold" level. The primary game server 551 indicates that the "Gold" level specifies that the player should receive three secondary game-play rounds. Then the secondary game server 552 plays a first of the game-play rounds for the secondary game. The secondary game server 552 determines that the first game-play round did not have a winning outcome, or in other words, a drawing for the secondary game did not have the matching three numbers "19," "7," and "21."

At a fourth stage, "D," the secondary game server 552 provides an indication of the outcome of the first game-play round, as well as scheduling instructions regarding additional drawings for the secondary game for which the player is eligible. The secondary game server 552 stores the three numbers and keeps them associated with the player via a player account. The secondary game server 552 can then hold one or more additional drawings where those three numbers can potentially win again, depending on whether they were drawn in the one or more additional drawings. The number of times that the secondary numbers are eligible can be based on the tier or level of the card/subscription for the player in the primary game (e.g., based on the "Gold" level).

At a final stage, "E," the mobile device 530 receives the outcome information and the scheduling instructions regarding the additional drawings for the secondary game. The mobile device 530 presents a message with the outcome and scheduling information. In some embodiments, the mobile device 530 uses the scheduling instructions received from the secondary game server 552 to generate a calendar event and/or reminder via a scheduling application of the mobile device 530 (e.g., to remind the player of the subsequent drawing the next day at 2 PM).

The flow 200 continues at processing block 212, where the system determines whether a user account is associated with a user of the mobile device. For example, in some embodiments the system determines that there is no user account. Specifically, a secondary game controller provides an indication of a prize in a format that can be redeemed anonymously. The secondary game controller provides a code to uniquely identify the prize, however the code does not uniquely identify the player. The player can redeem the code using the provider's system, which will recognize the code and provide the product or service associated with that code.

However, in some embodiments, the system determines that there is a user account. In such cases, the process then continues at block 214 where the system associates the outcome with the user account. For example, in some embodiments a secondary game controller detects identifying information about the player such as via a transaction associated with the purchase of the physical game card, via an application used on the mobile device, via data manually entered by the player via the mobile device, via configuration settings of the mobile device, via telecommunication devices associated with the mobile device, etc. The secondary game controller can use the identifying information about the player to customize the prize, provide the prize to the user, and/or store information about the prize. For example, the system can determine an account associated with the player (a "user" account or "player" account). The secondary game controller can then associate the outcome and/or an indication of the prize associated with the outcome, with the player account. The prize can be redeemed later by accessing the account. The player account can be a state-lottery user account, a wagering game player account, a web account, a social network user account, etc.

In one example, after scanning the secondary game code, the mobile device opens a gaming application on the mobile device. The gaming application has settings that store player account information, such as a user name and a password. The application automatically logs on to the account when opening the application on the mobile device. In other embodiments, the application provides information to a server to look up account information for the player so that the server can login to the player account.

In some embodiments, the login registers a unique identifier for the mobile device that associates the mobile device with the player. The unique identifier can be a phone serial number that is associated with user data (e.g., registered with contact data that identifiers where, and to whom, to send or provide prizes, such as a user's name, phone number, address, email address, account name or number, etc.). In some embodiments, the unique identifier can be linked with an account associated with the user.

In some embodiments, the player account is hosted by the prize provider (e.g., a wagering game player account hosted by a wagering game provider). In other embodiments, the player account is hosted by other services providers associated with non-wagering content providers (e.g., a social network account hosted by a social network provider). The account can be linked to other entities that provide the prize and/or additional prizes. For example, the account may be associated with a virtual casino. The virtual casino, and/or the account associated with the virtual casino, can be linked to a physical casino and/or a wagering game-player account (e.g., a player-tracking account, a customer loyalty account, etc.). The physical casino can provide prizes (e.g., free spins on slot machines, discounts, complimentaries, etc.).

Figure 6:
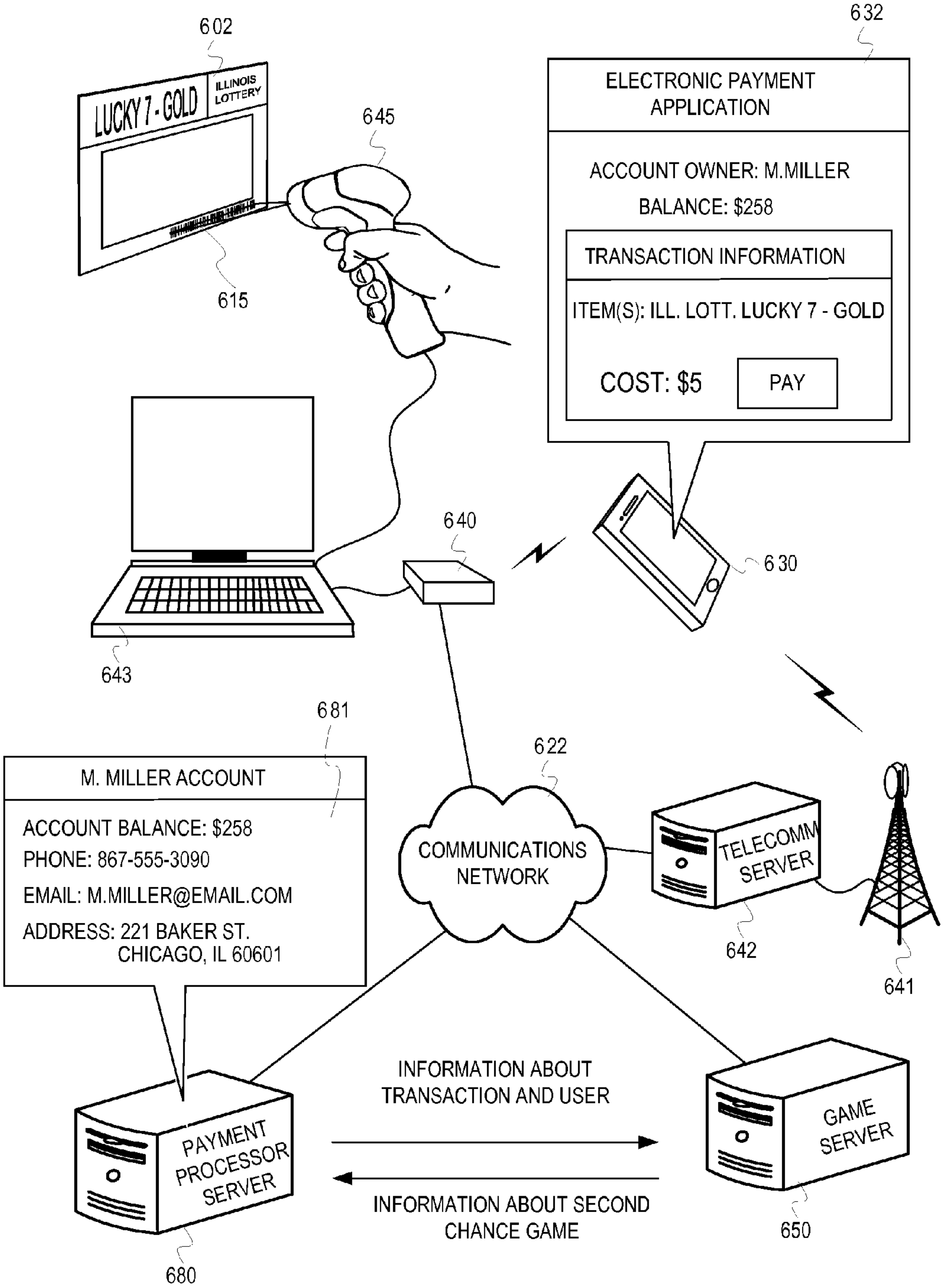
FIG. 6 is an illustration of controlling game play for a secondary game based on an electronic purchase of a physical game card via a mobile device, according to some embodiments.

In some embodiments, the user account is related to a payment processor for electronic funds that are used to purchase the physical game card. For instance, a user may utilize a form of electronic funds for payment of the physical game card using the mobile device. FIG. 6 illustrates an example. In FIG. 6, a mobile device 630 is configured to make electronic payments for goods or services. For example, the mobile device 630 communicates with a sensor 640 at the location where a physical game card 602 is purchased. The sensor 640 is linked with a merchant computer 643 to conduct the purchase at the point of sale. The sensor 640 is also connected to a server of a payment processor (the "payment processor server 680") via a communications network 622. The payment processor server 680 stores an account 681 for the purchaser (i.e., the user of the mobile device 630). The account 681 specifies an amount of electronic funds available to purchase goods or services such as the physical game card 602. The account 681 also includes contact information about the user and the mobile device 630.

The payment processor server 680 is an intermediary for the purchase and is associated with a service provider (e.g., GoogleWallet™ payment service, PayPal®, etc.) that provides a method of making purchases electronically with the mobile device 630. The user of the mobile device 630 logs in to their account using an application 632. The application 632 can indicate the item to be purchased. The application 632 can also specify an amount of electronic funds to use to make a purchase. The application 632 logs on to the account 681 via a telecommunications network (e.g., via a telecommunication tower 641 and telecommunication server 642). The application 632 can utilize information about the player and/or about the physical game card 602 that is purchased. The mobile device 630 communicates with the sensor 640 to transfer authorizing information about the purchase (e.g., the mobile device 640 touches or is brought within a given distance to the sensor 640, and the user presses a button on the application 632 that authorizes the purchase).

In one example, when the physical game card 602 is purchased, the application 632 and/or the sensor 640 detects data associated with the transaction (e.g., a merchant ID, a transaction ID, a product ID for the physical game card, a purchase amount ID, etc.) and uses the data to generate or obtain a secondary game code. The payment processor server 680 sends data about the user to the provider of the physical game card (i.e., the "merchant"). A device associated with the merchant ("merchant device"), such as the sensor 640 and/or the computer 643, can receive the data and use the data to generate a secondary game code. In another example, the merchant device can scan the physical game card to obtain information about the physical game card (e.g., a scanner 645 connected to the computer 643 scans a barcode 615 on the physical game card 602 and/or scans a secondary game code on a scratched off region of the physical game card 602). In another example, the merchant device can reveal the secondary game code to the player (e.g., via a terminal, via a text message, via a printed ticket) to manually enter into the application 632 on the mobile device 630 or the merchant device can automatically forward the secondary game code, and player data, via a data feed to the secondary game controller (e.g., to a game server 650). In another example, the merchant device can automatically provide the secondary game code to the payment processor server 680 (e.g., via the provider of the physical game card) to forward to the secondary game controller. In some examples, winnings for the secondary game can be automatically sent to the payment processor server 680 and stored in the account 681.

In some examples, the payment processor server 680 is linked to a server for a sponsor, or provider, of the secondary prize (e.g., the game server 650 or another server separate from the game server 650). For example, the payment processor server 680 can receive the indication of the prize via the secondary game controller and forward an indication of the prize directly to the prize provider (e.g., a server associated with GoogleWallet™ payment service sends an indication of a Groupon prize directly to a Groupon server to store in the player's Groupon account).

In some examples, the secondary game is not related to the scratch card but instead is related only to the payment processor server 680. For example, in some embodiments, the payment processor server 680 also functions as the game server 650 and secondary games are associated with the entity that provides the electronic funds service. For example, a server for Google Games provides the secondary game. When the purchase of the physical game card 602 is made, the payment processor server 680, therefore, could communicate with the Google Games server to generate the secondary game code. The payment processor server 680 then would associate the secondary game code with the account 681 and/or provide the secondary game code for presentation via the mobile device 630 (e.g., via the application 632).

Example Operating Environments

This section describes example operating environments, systems, networks, etc. and presents structural aspects of some embodiments.

Wagering Game System Architecture

Figure 7:
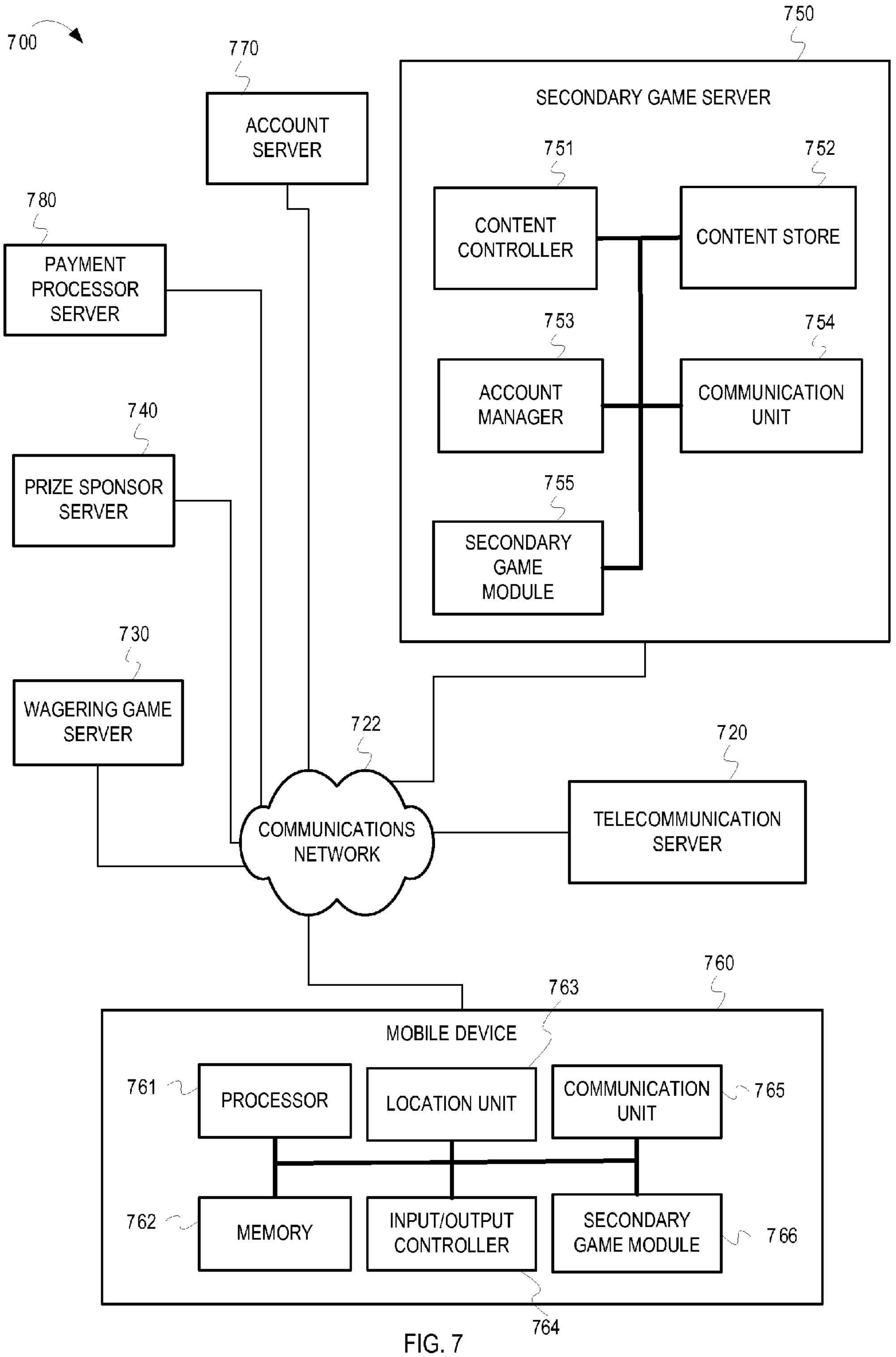
FIG. 7 is an illustration of a wagering game system architecture 700, according to some embodiments.

FIG. 7 is a conceptual diagram that illustrates an example of a wagering game system architecture 700, according to some embodiments. The wagering game system architecture 700 can include an account server 770 configured to control user related accounts accessible via a communications network 722. The account server 770 can store and track player information, such as identifying information (e.g., avatars, screen name, account identification numbers, etc.) or other information like financial account information, social contact information, etc. The account server 770 can contain accounts for social contacts referenced by the player account. The account server 770 can also provide auditing capabilities, according to regulatory rules, and track the performance of players, machines, and servers. The account server 770 can include an account controller configured to control information for a player's account. The account server 770 can also include an account store configured to store information for a player's account.

The wagering game system architecture 700 can also include a secondary game server 750 configured to control game content for a secondary game, provide random numbers, and communicate game information, account information, and other information to and from a mobile device 760. The secondary game server 750 can include a content controller 751 configured to manage and control content for presentation via an application of the mobile device 760. For example, the content controller 751 can generate game results (e.g., win/loss values), including win amounts, for games played on the application of the mobile device 760. The content controller 751 can communicate the game results to the mobile device 760. The content controller 751 can also generate random numbers and provide them to the mobile device 760 so that the mobile device 760 can generate game results. The secondary game server 750 can also include a content store 752 configured to contain content to present on the mobile device 760. The secondary game server 750 can also include an account manager 753 configured to control information related to player accounts. For example, the account manager 753 can communicate wager amounts, game results amounts (e.g., win amounts), bonus game amounts, etc., to the account server 770. The secondary game server 750 can also include a communication unit 754 configured to communicate information to the mobile device 760 and to communicate with other systems, devices and networks. The secondary game server 750 can also include a secondary game module 755 configured to detect a game code obtained via an input device of the mobile device 760, decode the game code, and initiate a game-play round for a secondary game. The secondary game module 755 is further configured to determine an outcome for the secondary game and provide an indication of the outcome to the communication unit 754. The communication unit 754 is configured to communicate the indication of the outcome to the mobile device 760. The secondary game module 755 is further configured to select a prize for the secondary game when the outcome is a winning outcome. The secondary game module 755 is configured to communicate with a prize sponsor server 740 to determine prizes that are available and communicate to the prize sponsor server 740 when a prize has been selected. In some embodiments, the secondary game module 755 is configured to receive from the prize sponsor server 740 prize codes and/or to generate prize codes that are used to redeem prizes. In some embodiments, the secondary game module 755 is configured to communicate with a payment processor server 780 to ascertain transaction information about an electronic purchase of a physical game card associated with a wagering game. The secondary game module 755 is configured to use the transaction information to control a portion of the secondary game. In some embodiments, the secondary game module 755 is further configured to communicate with a wagering game server 730 to obtain information about the wagering game associated with the physical game card and/or to provide information about the secondary game to the wagering game server 730.

The wagering game system architecture 700 can also include the mobile device 760 configured to present applications for gaming, communication, scheduling, contacts, and so forth, and receive and transmit information to enable game play and present outcomes related to the game play. The mobile device 760 can include a processor 761 configured to manage and control content and presentation of content on the mobile device 760. The mobile device 760 can also include a memory 762 configured to contain content to present on the mobile device 760. The mobile device 760 can also include a location unit 763 configured to detect and communicate a geographic location of the mobile device 760. The mobile device 760 can also include an input/output controller 764 configured to control input and output mechanisms and procedures. In some embodiments, the input/output controller 764 is configured to use input devices to obtain information from a physical game card. In some embodiments, the input/output controller 764 is configured to use output devices to present information about a secondary game. The mobile device 760 can also include a communication unit 765 configured to communicate data from the mobile device to various devices connected to the communications network 722. In some embodiments, the communication unit 765 is configured to communicate via a telecommunications network with a telecommunication server 720. The mobile device 760 can also include a secondary game module 766 configured to perform many of the functions of, and/or be a counterpart for, the secondary game module 755 associated with the secondary game server 750. For example, the secondary game module 766 can determine outcomes for a secondary game based on codes obtained via the mobile device 760 from physical game cards. In another example, the secondary game module 766 can receive outcomes from the secondary game module 755.

Each component shown in the wagering game system architecture 700 is shown as a separate and distinct element connected via the communications network 722. However, some functions performed by one component could be performed by other components. For example, the secondary game server 750 can also be configured to perform functions of the account server 770, the payment processor server 780, the prize sponsor server 740, the wagering game server 730, and other network elements and/or system devices. Furthermore, the components shown may all be contained in one device, but some, or all, may be included in, or performed by, multiple devices, as in the configurations shown in FIG. 7 or other configurations not shown. For example, the account manager 753 and the communication unit 754 can be included in the mobile device 760 or the wagering game server 730 instead of, or in addition to, being a part of the secondary game server 750. Further, in some embodiments, the mobile device 760 can determine wagering game outcomes, generate random numbers, etc. instead of, or in addition to, the wagering game server 730 and/or the secondary game server 750.

In some embodiments, wagering game machines (e.g., floor standing models, handheld mobile units, bar-top models, workstation-type console models, surface computing machines, etc.) and other devices configured to present wagering games, such as the mobile device 760, work with wagering game servers such that wagering game machines and/or other devices can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, wagering game machines, mobile devices, etc., can be primarily dedicated for use in conducting wagering games.

In some embodiments, wagering game machines can include non-dedicated devices, such as mobile phones, personal digital assistants, personal computers, etc.

In some embodiments, a wagering game client or a wagering game server can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 700 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Machine Architecture

Figure 8:
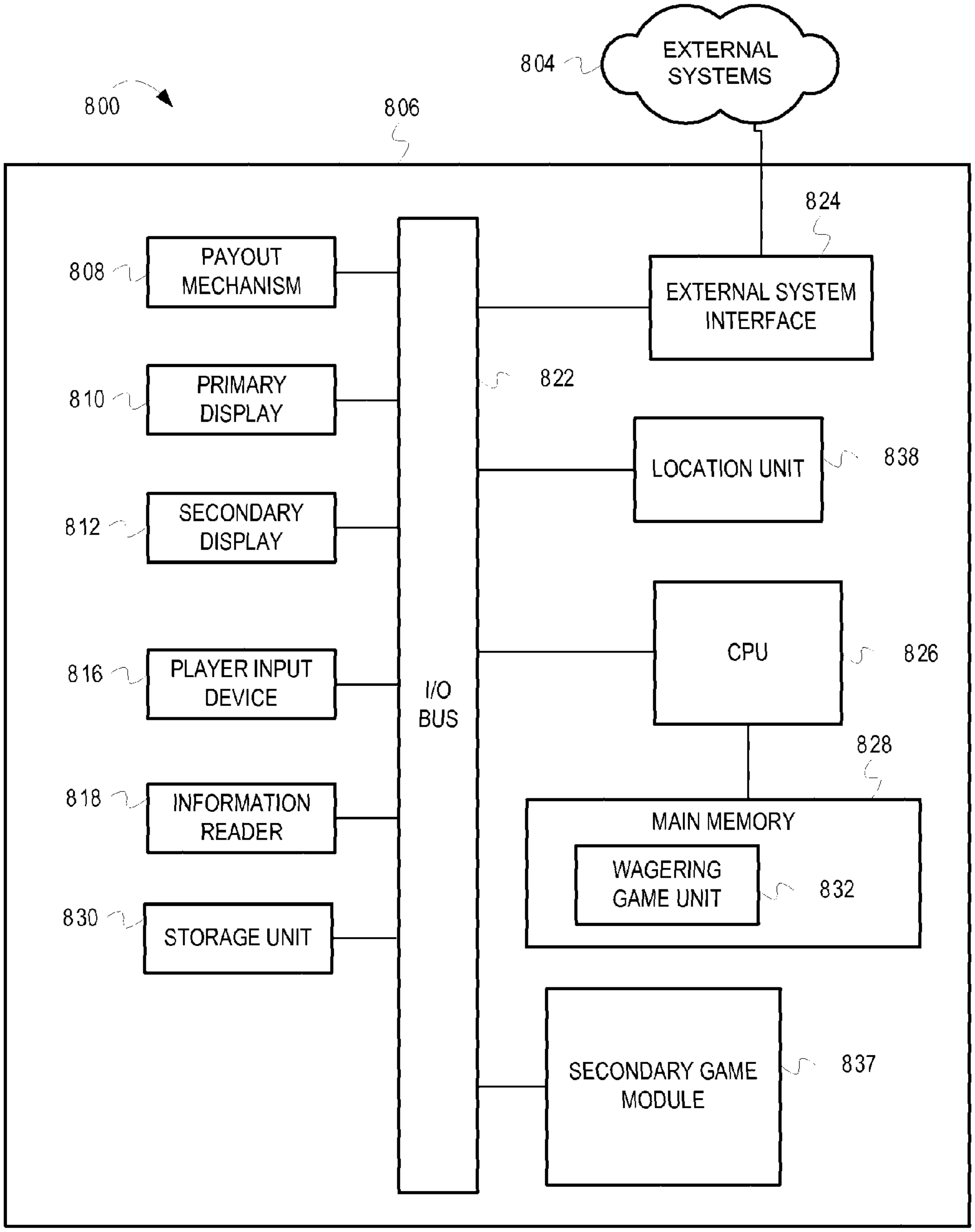
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes a secondary game module 837. The secondary game module 837 can process communications, commands, or other information, where the processing can provide secondary wagering game play via a mobile device.

Furthermore, any component of the wagering game machine 806 can include hardware, firmware, and/or machine-readable storage media including instructions for performing the operations described herein.

Wagering Game System

Figure 9:
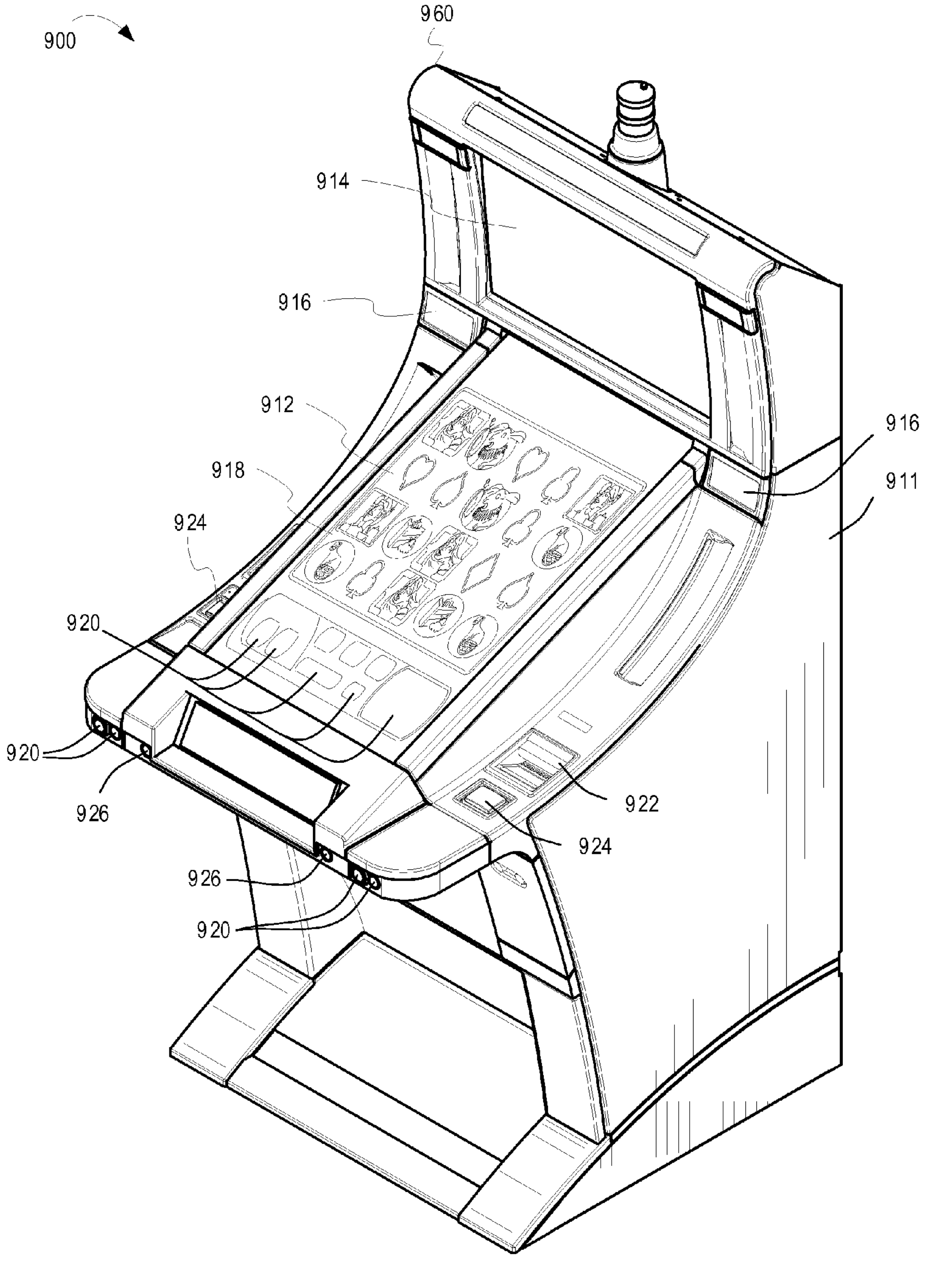
FIG. 9 is an illustration of a wagering game system 900, according to some embodiments.

FIG. 9 is a conceptual diagram that illustrates an example of a wagering game system 900, according to some embodiments. In FIG. 9, the wagering game system 900 includes a wagering game machine 960 similar to those used in gaming establishments, such as casinos. The wagering game machine 960 may, in some examples, be referred to as a gaming terminal or an electronic gaming machine. The wagering game machine 960 may have varying structures and methods of operation. For example, the wagering game machine 960 may include electromechanical components configured to play mechanical slots. In another example, the 960 includes electronic components configured to play a video casino game, such as slots, keno, poker, blackjack, roulette, craps, etc. The wagering game machine 960 is depicted as a floor-standing model. However, other examples of wagering game machines include handheld mobile units, bartop models, workstation-type console models, etc. Further, the wagering game machine 960 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 960 illustrated in FIG. 9 comprises a cabinet 911 that may house various input devices, output devices, and input/output devices. By way of example, the wagering game machine 960 includes a primary display area 912, a secondary display area 914, and one or more audio speakers 916. The primary display area 912 or the secondary display area 914 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 912 or the secondary display area 914 includes mechanical reels to display a wagering game outcome. In some example, the primary display area 912 or the secondary display area 914 present a transmissive video display disposed in front of a mechanical-reel display to portray a video image superimposed upon the mechanical-reel display. In FIG. 9, the wagering game machine 960 is a "slant-top" version in which the primary display 912 is slanted (e.g., at about a thirty-degree angle toward the player of the wagering game machine 960). Another example of wagering game machine 960 is an "upright" version in which the primary display 914 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 960. The wagering game machine 960 includes a touch screen(s) 918 mounted over the primary or secondary areas, buttons 920 on a button panel, bill validator 922, information reader/writer(s) 924, and player-accessible port(s) 926 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 918, buttons 920, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form (e.g., software, processing application) readable by a machine (e.g., a computer). For example, machine-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system, the method, comprising:

determining, via a network communication interface of the gaming system, an electronic indicator for a game code associated with a secondary game, wherein a physical item associated with the secondary game was scanned from a physical game card by a mobile device, and wherein the physical game card is associated with a wagering game separate from the secondary game;

determining, via at least one of one or more processors of the gaming system, an outcome for the secondary game based on the electronic indicator for the game code in response to the physical item being scanned; and providing, via the network communication interface, an electronic indication of the outcome for presentation via the mobile device, and wherein the determining the electronic indicator for the game code comprises:

receiving, via the network communication interface, a first electronic message from the mobile device, wherein the first electronic message includes an electronic copy of the game code;

automatically verifying, via at least one of the one or more processors, that the electronic copy of the game code is valid for the secondary game;

generating, via at least one of the one or more processors, a second electronic message with a web link; and sending, via the network communication interface, the second electronic message with the web link, wherein the mobile device is configured to open the web link in a browser application.

2. The method of claim 1, wherein the physical item includes at least one member of the group consisting of a magnetic strip, a Radio Frequency Identification (RFID) tag, and a graphic of the game code printed on the physical game card in a computer-readable format, and wherein the mobile device is configured to scan the graphic via an image scanning device of the mobile device.

3. The method of claim 1 further comprising associating one or more of the outcome for the secondary game and a prize associated with the outcome with an account associated with a user of the mobile device.

4. The method of claim 1 further comprising:

detecting information associated with an electronic purchase of the physical game card made via the mobile device; and using the information associated with the electronic purchase to one or more of determine the outcome, or associate the outcome with a user account.

5. The method of claim 1 further comprising communicating the electronic indicator for the game code and the electronic indication of the outcome via a wagering game application of the mobile device.

6. The method of claim 1 further comprising:

determining, via an electronic location tracking unit of the mobile device, a geographic location of the mobile device relative to a business establishment outside a casino; and selecting a prize, associated with the business establishment, for the outcome based on the geographic location of the mobile device relative to the business establishment.

7. One or more non-transitory, machine-readable storage devices having instructions stored thereon, which when executed by a set of one or more processors of a gaming system cause the gaming system to perform operations, comprising:

determining an electronic indicator for a game code associated with a secondary game, wherein the determining comprises scanning, from a physical game card by a mobile device, a physical item associated with the secondary game, and wherein the physical game card is associated with a wagering game separate from the secondary game;

determining, via at least one of the set of one or more processors, the electronic indicator for the game code in response to the physical item being scanned;

providing, via at least one of the set of one or more processors, an electronic indication of the outcome for presentation via an electronic output device of the mobile device; and wherein said operations further comprising one or more of decoding the electronic indicator for the game code, verifying that the game code is valid for the secondary game, and generating the outcome for the secondary game.

8. The one or more non-transitory, machine-readable storage devices of claim 7, said operations further comprising associating one or more of the outcome for the secondary game or a prize for the outcome of the secondary game with an account associated with a user of the mobile device.

9. The one or more non-transitory, machine-readable storage devices of claim 7, wherein the game code is printed on the physical game card in a computer-readable format and wherein an input device of the gaming system is configured to scan the game code in the computer-readable format.

10. The one or more non-transitory, machine-readable storage devices of claim 9, wherein the input device comprises one or more of a magnetic reader, an optical scanner, a radio-frequency detector, and a near-field communication sensor.

11. The one or more non-transitory, machine-readable storage devices of claim 7, said operations further determining the electronic indicator for the game code via a first application of the mobile device and providing the electronic indication of the outcome via a second application of the mobile device different from the first application.

12. The one or more non-transitory, machine-readable storage devices of claim 7, said operations further comprising communicating the electronic indication of the game code via a text messaging application of the mobile device and one or more of receiving a link associated with the secondary game or receiving the electronic indication of the outcome via the text messaging application.

13. The one or more non-transitory, machine-readable storage devices of claim 7, said operations further comprising:

scanning a graphic of the physical game card via the mobile device; and presenting the outcome, via the mobile device, with game elements of the secondary game superimposed over a portion of an image of the physical game card, wherein the outcome, the game elements of the secondary game, and the image of the physical game card are presented via a display of the mobile device.

14. A gaming system, comprising:

one or more electronic processing units; and at least one memory device configured to store instructions which, when executed by the at least one of the one or more electronic processing units, cause the gaming system to perform operations to determine an electronic indicator for a game code associated with a secondary game, wherein a physical item associated with the secondary game is scanned from a physical game card by a mobile device, and wherein the physical game card is associated with a wagering game separate from the secondary game, determine the electronic indicator for the game code in response to the physical item being scanned, and provide an electronic indication of the outcome for presentation via the mobile device; and wherein the at least one memory device is configured to store instructions which, when executed by the at least one of the one or more electronic processing units, cause the gaming system to perform operations to:

receive, via a network communication interface of the gaming system, a first electronic message from the mobile device, wherein the first electronic message includes an electronic copy of the game code;

automatically verify that the electronic copy of the game code is valid for the secondary game;

generate a second electronic message with a web link; and send the second electronic message with the web link, wherein the mobile device is configured to open the web link in a browser application.

15. The gaming system of claim 14, wherein the physical item includes at least one member of the group consisting of a magnetic strip, a Radio Frequency Identification (RFID) tag, and a graphic of the game code printed on the physical game card in a computer-readable format, and wherein the mobile device is configured to scan the graphic via an image scanning device of the mobile device.

16. The gaming system of claim 14, wherein the at least one memory device is configured to store instructions which, when executed by the at least one of the one or more electronic processing units, cause the gaming system to perform operations to associate one or more of the outcome for the secondary game and a prize associated with the outcome with an account associated with a user of the mobile device.

17. The gaming system of claim 14 wherein the at least one memory device is configured to store instructions which, when executed by the at least one of the one or more electronic processing units, cause the gaming system to perform operations to:

detect information associated with an electronic purchase of the physical game card made via the mobile device; and use the information associated with the electronic purchase to one or more of determine the outcome, or associate the outcome with a user account.

18. The gaming system of claim 14, wherein the at least one memory device is configured to store instructions which, when executed by the at least one of the one or more electronic processing units, cause the gaming system to perform operations to communicate the electronic indicator for the game code and the electronic indication of the outcome via a wagering game application of the mobile device.

19. The gaming system of claim 14, wherein the at least one memory device is configured to store instructions which, when executed by the at least one of the one or more electronic processing units, cause the gaming system to perform operations to:

determine, via an electronic location tracking unit of the mobile device, a geographic location of the mobile device relative to a business establishment outside a casino; and select a prize for the outcome based on the geographic location of the mobile device, wherein the prize is redeemable at the business establishment.

* * * * *